United States Patent Office 3,487,469
Patented Dec. 30, 1969

3,487,469
1,2-DIARYL-3-(AMINOMETHYL)-3-BUTEN-2-OLS AND THEIR ACYL DERIVATIVES
Adrian Marxer, Binningen, Switzerland, assignor to Ciba Corporation, New York, N.Y., a corporation of Delaware
No Drawing. Continuation-in-part of application Ser. No. 541,971, Apr. 12, 1966. This application Mar. 28, 1968, Ser. No. 716,980
Claims priority, application Switzerland, Feb. 26, 1965, 2,677/65; June 28, 1965, 9,028/65; Sept. 22, 1965, 13,111/65; Dec. 30, 1965, 18,118/65, 18,119/65; Jan. 4, 1968, 78/68
Int. Cl. C07c 91/16, 93/16; A61k 27/00
U.S. Cl. 260—268                    13 Claims

---

ABSTRACT OF THE DISCLOSURE

Compounds of the formula:

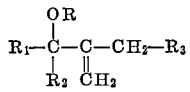

in which:
R is hydrogen or acyl
$R_1$ is aryl
$R_2$ is aralkyl
$R_3$ is a tertiary amino group e.g. 1,2-diphenyl-2-propionyloxy-3-(dimethylaminomethyl)-3-butene.
*Use.*—Analgesic agents and intermediates.

---

CROSS-REFERENCES TO OTHER APPLICATIONS

This is a continuation-in-part of my copending applications Ser. No. 541,971, filed Apr. 12, 1966 and Ser. No. 496,183, filed Oct. 14, 1965, both now abandoned.

SUMMARY OF THE DISCLOSURE

The present invention relates to new tertiary amines. Especially it concerns amines of the formula:

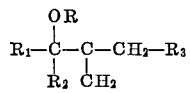

in which R stands for hydrogen or an acyl radical, $R_1$ for an aryl radical, $R_2$ for an aralkyl radical and $R_3$ for an aliphatic tertiary amino group, their salts, and pharmaceutical compositions containing these compounds as well as a method for relieving pain consisting in administering to a subject such pharmaceutical compositions.

The acyl radicals may be above all lower alkanoyl radicals such as acetyl, propionyl, butyryl radicals, or lower carbakoxy radicas such as carbopropoxy, carbethoxy or carbomethoxy radicals.

Aryl radicals are above all phenyl radicals. Aralkyl radicals are primarily phenyl-lower alkyl radicals, e.g. benzyl or 1- or 2-phenylethyl radicals. The aforementioned aryl and aralkyl radicals may be unsubstituted in the aromatic ring or contain one, two or more substituents such, for example, as lower alkyls such as methyl, ethyl, propyl or isopropyl; or linear or branched butyl radicals bound in any desired position; lower alkoxy groups, especially methoxy, ethoxy, propoxy or butoxy groups; or halogen atoms, above all fluorine, chlorine or bromine atoms or the trifluoromethyl group.

A suitable aliphatic tertiary amino group is an amino group substituted by a bivalent radical or two monovalent radicals of aliphatic character. Substituents suitable for the amino groups are above all alkyl radicals such as lower alkyl radicals, e.g. those mentioned above, or linear or branched alkylene radicals, e.g. butylene-(1,4), pentylene-(1,5), 1,5-dimethylpentylene-(1,5), hexylene-(1,6), hexylene-(1,5) or monooxa-, or monothia- or monoaza-alkylene radicals, especially those comprising, together with the nitrogen atoms, up to 8 cyclic members, e.g. 3-oxa- or 3-thiapentylene-(1,5), 3-methyl-3-aza-hexylene-(1,6), 3-ethyl-1,5-dimethyl-3-azapentylene-(1,5) or 3-methyl-3-aza-pentylene-(1,5).

The tertiary aliphatic amino group is above all a pyrrolidino, piperidino, morpholino, thiamorpholino or $N'$-lower alkylpiperazino group such as the $N'$-methylpiperazino group, or above all a di-lower alkylamino group, such as the diethylamino or better still the dimethylamino group.

The new compounds possess valuable pharmacological properties and act especially as analgesics, as can be shown in animal experiments, e.g. on oral administration to mice in doses from 20 to 150 mg./kg., e.g. in the writhing syndrome test; and they are of a relatively low toxicity. Moreover, they have an antagonistic action towards morphine. The compounds are therefore useful as analgesics. Moreover, e.g. in the rat, the rabbit, the cat, and the dog, they have a diuretic effect and also have an antitussive and a spasmolytic action. They are therefore useful as medicaments also for the relative purposes.

The new compounds may also be used as starting materials or intermediates for the manufacture of other valuable compounds.

Particularly valuable for their pharmacological action are the compounds of the formula:

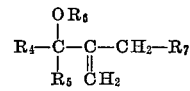

where $R_4$ is a phenyl group which may be substituted, for example as indicated above, or may advantageously be unsubstituted; $R_5$ is a benzyl group which may be substituted, for example as indicated above, or may advantageously be unsubstituted; $R_6$ stands for hydrogen or preferably for a lower alkanoyl radical and $R_7$ for a piperidino, $N'$-lower alkyl-piperazino or morpholino group or especially a pyrrolidino group or above all for a di-lower alkylamino group, such as the diethylamino or especially the dimethylamino group, especially the compounds of the formula:

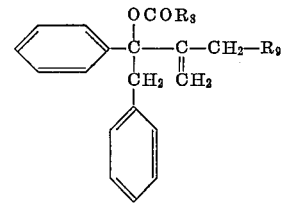

where $R_8$ stands for the methyl or ethyl group and $R_9$ for the dimethylamino or pyrrolidino group—and in the first place 1,2-diphenyl-2-propionyloxy - 3 - (dimethylaminomethyl)-3-butene, which, for example, in the form of its hydrochloride, on oral administration to the mouse of 30–60 mg./kg. doses, has a pronounced analgesic action, and above all d-(+)-1,2-diphenyl-2-propionyloxy-3-(dimethylaminomethyl)-3-butene, which, for example in the form of its maleate, on oral administration to the mouse of 20–40 mg./kg. doses has a pronounced analgesic action.

The new compounds are manufactured by known methods; for example, a ketone of the formula:

(where $R_1$ and $R_2$ have the above meanings) is reacted with a compound of the formula:

$$\text{Hal Mg}-\underset{\underset{CH_2}{\|}}{C}-CH_2-R_3$$

(where $R_3$ has the above meaning and Hal stands for chlorine, bromine or iodine), the resulting complex is decomposed and, if desired, the free hydroxyl group is acylated.

The reaction of the above-mentioned compounds is performed in known manner, primarily in the presence of a solvent or diluent, e.g., an ether such as tetrahydrofurane. The decomposition of the resulting complex is achieved in the usual manner, e.g., by hydrolysis.

The acylation may be performed, e.g., by reaction with an acylating agent, e.g., with a functional derivative of the desired acid, such as a halide, especially chloride, or an anhydride, e.g., an inner anhydride such as a ketone.

Depending on the reaction conditions and starting materials used, the final products are obtained in the free form or in the form of their salts which are likewise included in the present invention. The salts of the final products can be converted into the free bases in known manner, e.g., with alkalies or ion exchange resins. Salts are obtained from the free bases on treating the latter with organic or inorganic acids, especially those which are capable of forming therapeutically acceptable salts. As such acids there may be mentioned, for example, hydrohalic, sulfuric, phosphoric acids, nitric and perchloric acid; aliphatic, alicyclic, aromatic and heterocyclic carboxylic and sulfonic acids such as formic, acetic, propionic, succinic, glycollic, lactic, malic, tartaric, citric, ascorbic, maleic, hydroxymaleic, pyruvic or laevulic acid; phenylacetic, benzoic, para-aminobenzoic, anthranilic, para-hydroxybenzoic, salicyclic or para-aminosalicyclic, methanesulfonic, ethanesulfonic, hydroxyethanesulfonic, ethylenesulfonic acid; halobenzenesulfonic, toluenesulfonic, naphthalenesulfonic acid, sulphanilic acid; methionine, tryptophan, lysine and arginine.

These and other salts of the new compounds, e.g., their picrates, may also be used for purifying the resulting free bases by converting the latter into salts, isolating the salts and separating the free bases from them again. In view of the close relationship between the new compounds in the free form and in the form of their salts, what has been said above and below with reference to the free bases applies also to the corresponding salts wherever this is suitable and possible.

The invention further includes any variant of the present process in which an intermediate obtained at any stage is used as starting material and any remaining steps are carried out or the process is discontinued at any stage thereof, or in which the starting materials are formed in situ or the reactants are used in the form of their salts, if desired.

For example, the hydroxyl compound to be acylated may be used in the form of its O-salts, such as the O-metal salts, for example of the O-alkali metal salts, such as the sodium or potassium salts or of the O-magnesium halide salts, such as the magnesium bromide salts, as formed, for example in the Grignard reaction, that is to say, the complex obtained from the Grignard reaction can be reacted as it is with the acylating agent.

The reactions of the invention are advantageously carried out with the compounds referred to as specially valuable above.

The starting materials are known or can be prepared by known methods.

A resulting racemate can be resolved into the optical antipodes by a known method, for example as follows: The racemic base is dissolved in a suitable inert solvent, reacted with an optically active acid, and the resulting salts are separated—e.g., by virtue of their different solubilities—into the diastereomers from which the antipodes of the new bases can be liberated by treatment with an alkaline agent. Particularly frequently used optically active acids are the D- and L-forms of tartaric, di-orthotoluyltartaric, malic, mandelic, camphorsulfonic or quinic acid. The separation can also be achieved, for example, by recrystallizing the resulting pure racemate from an optically active solvent. It is advantageous to isolate the more active of the two antipodes.

The new compounds can be used, for example, in the form of pharmaceutical preparations which contain them in the free form or in the form of their salts in admixture or conjunction with an organic or inorganic, solid or liquid pharmaceutical excipient suitable for enteral, parenteral or local administration. Suitable excipients are substances that do not react with the new substances, e.g., water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees, capsules, salves or creams, or in liquid form solutions, suspensions or emulsions. They may be sterilized and/or contain assistants such as preserving, stabilizing, wetting or emulsifying agents, solutions promoters, salts for regulating the osmotic pressure or buffers. They may also contain further therapeutically valuable substances. The pharmaceutical preparations are formulated by the conventional methods.

The following examples illustrate the invention.

EXAMPLE 1

7.2 g. of magnesium (0.3 mol) are etched with a small amount of iodine in a stirring flask and then mixed with 20 ml. of absolute tetrahydrofuran and 0.8 ml. of ethyl bromide. The reaction is initiated by moderate heating, and within 15 to 20 minutes 49.2 g. (0.3 mol) of N,N-dimethyl-2-bromallylamine in 50 ml. of absolute tetrahydrofuran are dropped in at a rate such that the solution keeps boiling. The batch is stirred on for 30 minutes at the boil until practically all of the magnesium has dissolved. Without cooling, 39.3 g. (0.2 mol) of desoxybenzoin in 125 ml. of absolute tetrahydrofuran are then dropped in at a rate such that the reaction solution keeps boiling and it is then refluxed for 6 hours, poured into a solution of 60 g. of ammonium chloride in ½ liter of water, and the precipitated oil is extracted with ether, the extract washed with water and repeatedly extracted with 2 N-acetic acid (total ½ liter). The acetic acid solution is alkalinized with 125 ml. of 10 N-sodium hydroxide solution and the precipitated oil taken up in ether. The ethereal solution is dried and the ether evaporated, to yield 1,2-diphenyl-3-dimethylaminomethyl-3-buten-2-ol of the formula:

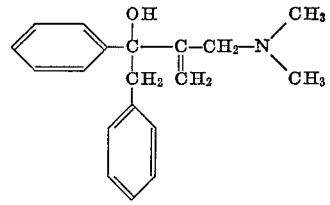

which crystallizes on storing and melts at 56 to 58 C.

Addition to this base in ethyl acetate of the calculated amount of ethanolic hydrochloric acid furnishes 1,2-diphenyl-3-dimethylaminomethyl-3-buten-2-ol hydrochloride melting at 236 to 238° C.

The N,N-dimethyl-2-bromallylamine of the formula:

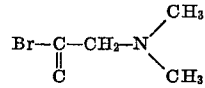

(boiling at 63 to 64° C. under 79 mm. Hg pressure) used as starting material may be prepared by introducing 2 mols of dimethylamine into a benzolic solution of 2,3-dibromopropene while cooling with ice, following by heating to 50° C.

EXAMPLE 2

A mixture of 26.7 g. of 1,2-diphenyl-3-dimethylaminomethyl-3-buten-2-ol and 100 ml. of propionic acid anhydride is heated for 5 hours at 50° C. The excess propionic acid anhydride is then evaporated under vacuum; while cooling the residue thoroughly it is mixed with sodium bicarbonate solution to establish an alkaline reaction, extracted twice with ether and the ethereal solution is washed with water, dried and evaporated, to yield 1,2-diphenyl-2-propionyloxy-3-(dimethylaminomethyl)-3-butene of the formula:

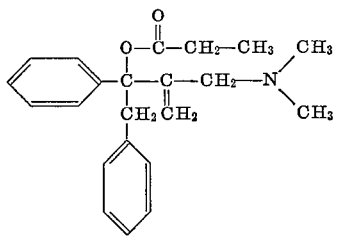

When this compound is reacted in ethyl acetate with ethanolic hydrochloric acid, it yields 1,2-diphenyl-2-propionyloxy-3-dimethylaminomethyl-3 - buten hydrochloride melting at 188° C.

EXAMPLE 3

A mixture of 15 g. of 1,2-diphenyl-3-dimethylaminomethyl-3-buten-2-ol, 75 ml. of acetic anhydride and 75 ml. of pyridine is heated for 5 hours at 40° C. The reaction mixture is evaporated under vacuum, the residue dissolved in 75 ml. of water while being cooled with ice; the solution is rendered alkaline with 150 ml. of saturated sodium bicarbonate solution, taken up in ether and washed with water. The ether is evaporated and the residue dissolved in 200 ml. of ethyl acetate; on addition of 22 ml. of 2.4 N-ethanolic hydrochloric acid 1,2-diphenyl-2-acetoxy-3-dimethylaminomethyl-3-buten hydrochloride of the formula:

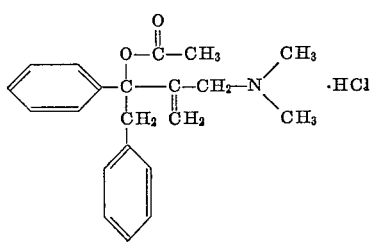

melting at 189° C. is obtained.

EXAMPLE 4

7.2 g. magnesium (0.3 mol) are etched in a stirring flask with a small amount of iodine, and 20 ml. of absolute tetrahydrofuran and 0.8 ml. of ethyl bromide are added. The reaction is initiated by moderate heating, and in the course of 15 to 20 minutes 57.6 g. (0.3 mol.) of N,N-diethyl-2-bromallylamine in 50 ml. of absolute tetrahydrofuran are dropped in at a rate such that the solution keeps boiling. The batch is stirred for another 30 minutes at the boil until practically all magnesium has dissolved. The resulting solution is treated dropwise at the boil with 39.2 g. (0.2 mol.) of desoxybenzoin in 125 ml. of tetrahydrofuran, and the reaction mixture is then refluxed for 6 hours, poured into a solution of 60 g. of ammonium chloride in ½ liter of water, the precepitated oil is taken up in ether and the ethereal solution extracted with 2 N-acetic acid. The acetic acid solution is rendered alkaline with 10 N-sodium hydroxide solution and extracted with ether. The extract is evaporated and the residue dissolved in ethyl acetate and ethanolic hydrochloric acid is added, whereupon 1,2-diphenyl-3-diethylaminomethyl-3-buten - 2-ol hydrochloride of the formula:

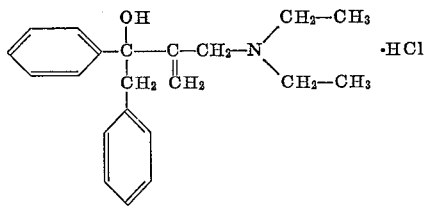

melting at 175° C. is obtained.

EXAMPLE 5

7.2 g. of magnesium (0.3 mol) are etched in a stirring flask with a small amount of iodine, and 20 ml. of absolute tetrahydrofuran and 0.8 ml. of ethyl bromide are added. The reaction is initiated by moderate heating, and in the course of 15 to 20 minutes 61.2 g. (0.3 mol) of N-(2-bromallyl)-piperidine in 50 ml. of absolute tetrahydrofuran are dropped in at a rate such that the solution keeps boiling. The batch is stirred for another 30 minutes at the boil until practically all magnesium has dissolved, and the resulting solution is mixed with 39.2 g. (0.2 mol) of desoxybenzoin in 125 ml. of absolute tetrahydrofuran. The batch is then refluxed for 8 hours, poured into an aqueous ammonium chloride solution, taken up in ether and exhaustively extracted with 2 N-hydrochloric acid. 1,2-diphenyl-3-piperidinomethyl-3-buten-2-ol hydrochloride of the formula:

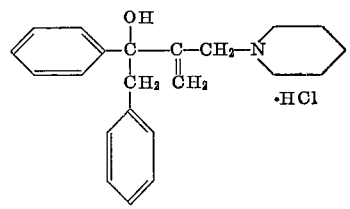

crystallizes directly from the hydrochloric solution; it melts at 198° C. and, after recrystallization from isopropanol, at 202 to 204° C.

EXAMPLE 6

7.2 g. of magnesium (0.3 mol) are etched in a stirring flask with a small amount of iodine, and 20 ml. of absolute tetrahydrofuran and 0.8 ml. of ethyl bromide are added. The reaction is initiated by moderate heating, and within 15 to 20 minutes 49.2 g. (0.3 mol) of N,N-dimethyl-2-bromallylamine in 50 ml. of absolute tetrahydrofuran are dropped in at a rate such that the solution keeps boiling. The batch is stirred for another 30 minutes at the boil until practically all magnesium has dissolved, whereupon 51.2 g. (0.2 mol) of desoxyanisoin in 125 ml. of tetrahydrofuran are dropped into the resulting solution. The batch is then refluxed for 8 hours, poured into aqueous ammonium chloride solution, extracted with ether and the ethereal solution is extracted with 2 N-acetic acid. The acetic acid solution is rendered alkaline with 10 N-sodium hydroxide solution, the precipitated oil taken up in ether and the ethereal solution is washed with water and evaporated. The residue is dissolved in ethyl acetate and ethanolic hydrochloric acid added, whereupon 1,2 - di-(para-methoxyphenyl) - 3-dimethylaminomethyl-3-buten-2-ol hydrochloride of the formula:

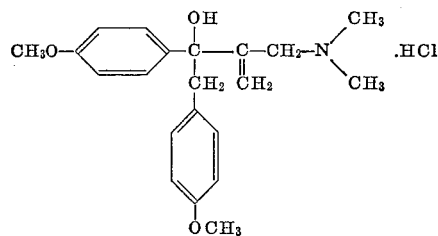

melting at 199° C. is obtained.

EXAMPLE 7

In a flask equipped with a stirrer, 7.2 g. of magnesium (0.3 mol) are etched with a little iodine and treated with 20 ml. of absolute tetrahydrofuran and 0.8 ml. of ethyl bromide. The reaction is initiated by slight heating, and in the course of 15–20 minutes, 49.2 g. (0.3 mol) of N,N-dimethyl-2-bromallylamine in 50 ml. of absolute tetrahydrofuran are added dropwise in such manner that the solution remains constantly boiling. Heating at the boil and stirring is continued for another 30 minutes to ensure that the magnesium dissolves except for small traces. After that, 39.3 g. (0.2 mol) of desoxybenzoin in 125 ml. of absolute tetrahydrofuran are added dropwise in such manner that the reaction solution always remains boiling. The batch is then refluxed for 6 hours. Into this solution which contains the magnesium bromide salt of the formula:

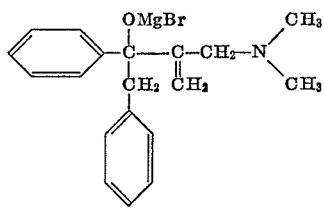

there is then added dropwise at about 30° C. a solution of 97.8 g. (0.75 mol) of propionic anhydride in 50 ml. of tetrahydrofuran. This operation is followed by heating at 50° C. for 5 hours. The solution is concentrated to about 50–100 ml., then poured into 500 ml. of water. The turbid aqueous solution is extracted with ether (ethereal solution A). From the aqueous phase a basic residue is obtained on treatment with 50 ml. of a saturated sodium bicarbonate solution, extraction with ether and evaporation of the ether.

The ethereal solution A is extracted with 250 ml. of ice-cold 2 N-hydrochloric acid. Treatment of the extract with 300 ml. of ice-cold 2 N-ammonium hydroxide solution, extraction with ether and evaporation of the ether yields a basic residue. The latter, and the aforementioned basic residue are combined, dissolved in 100 ml. of ethyl acetate, and treated with 2.5 N-ethanolic hydrochloric acid until a slightly acid reaction is attained. During this operation, 1,2-diphenyl - 2 - propionyloxy - 3-dimethylaminomethyl-3-butene hydrochloride of melting point 188° C. crystallizes.

The same reaction product is obtained when the propionic acid anhydride is replaced by 60.0 g. of propionyl chloride (0.75 ml.) in 50 ml. of tetrahydrofuran.

EXAMPLE 8

13.5 g. of 1,2-diphenyl-3-piperidinomethyl-3-butene-2-ol are dissolved in 200 ml. of methylene chloride, and treated with a current of ketene (about 1 mol) for 1 hour. The solution is evaporated under vacuum, the residue dissolved in 75 ml. of ethyl acetate, and the solution treated with 15 ml. of 2,5 N-alcoholic hydrochloric acid. After a while, the turbid solution is filtered, the filtrate evaporated to dryness, and the residue dissolved in 20 ml. of ethyl acetate. After some time, the 1,2-diphenyl-2-acetoxy-3-piperidinomethyl-3-butene hydrochloride of the formula

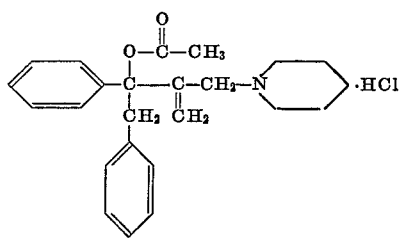

crystallizes. It is purified by recrystallization from isopropanol and then melts at 182–184° C.

EXAMPLE 9

13.5 g. of 1,2-diphenyl-3-piperidinomethyl-3-butene-2-ol are heated to 60° C. for 5 hours in an oil bath with 75 ml. of acetic anhydride. The actic anhydride is evaporated under reduced pressure, the residue dissolved in 175 ml. of ethyl acetate, 18 ml. of 2.5 N-alcoholic hydrochloric acid are added to attain a slightly acid reaction, the batch is allowed to stand for some time, and then a certain amount of hydrochloride of the starting material (melting point 202–204° C.) isolated. The mother liquor is evaporated under vacuum and the residue allowed to stand with a small amount of ethyl acetate (25 ml.), whereupon crystallization sets in. The resulting crystallizate (melting point 175–177° C.) is recrystallized from isopropanol and yields 1,2-diphenyl-2-acetoxy-3-piperidinomethyl-3-butene hydrochloride melting at 182–184° C. It is identical with the product described in Example 8.

EXAMPLE 10

16.0 g. of 1,2-diphenyl-3-(diethylaminomethyl)-3-buten-2-ol are heated at an oil bath temperature of 110° C. for 5 hours in 100 ml. of acetic anhydride. The reaction solution is then evaporated to dryness under reduced pressure, the residue dissolved in 75 ml. of ethyl acetate, the solution slightly acidified with 20 ml. of 2.5 N-alcoholic hydrochloric acid, then concentrated to a small volume, filtered to remove a small amount of crystals, again fully concentrated, and allowed to stand with 25 ml. of ethyl acetate. After some time, the 1,2-diphenyl-2-acetoxy-3-(diethylaminomethyl)-3-butene hydrochloride of the formula

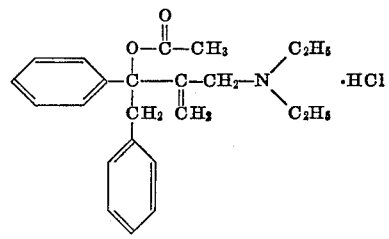

crystallizes. It melts at 137–139° C. In the infra-red spectrum it shows an intensive ester bond at 5.76μ.

EXAMPLE 11

21.6 g. of magnesium (0.9 mol) are etched with a little iodine and covered with 60 ml. of absolute tetrahydrofuran. The Grignard reaction is triggered off with 1 ml. of ethyl bromide. While stirring, 171.1 g. (0.9 mol) of 2-bromally-pyrrolidine in 150 ml. of tetrahydrofuran are added dropwise, and the batch refluxed for another 30 minutes, the magnesium passing into solution in a vigorous reaction. In the course of 20 minutes, 117.6 g. (0.6 mol) of desoxybenzoin in 375 ml. of tetrahydrofuran are added portionwise in such manner that the reaction solution keeps boiling. The batch is refluxed for 8 hours, half of the tetrahydrofuran is distilled off, and the reaction mixture poured into 180 g. of ammonium chloride in 1500 ml. of water. The reaction mass is then dissolved in ether, washed with water, and the ether extracted with a total of 1000 ml. of 2 N-acetic acid and finally with 100 ml. of 2 N-hydrochloric acid. The acid extracts are treated with 250 ml. of 10 N-sodium hydroxide solution, the oil that precipitates is dissolved in ether, and the solution washed with water. Evaporation of the ether gives 1,2-diphenyl-3-(pyrrolidinomethyl)-3-buten-2-ol of the formula:

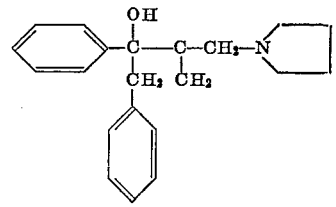

in the form of an oil which crystallizes extremely slowly.

From a solution of the base in ethyl acetate solution 1,2-diphenyl-3-(pyrrolidino-methyl)-3-buten-2-ol hydrochloride of melting point 223–225° C. can be obtained by means of alcoholic hydrochloric acid.

The N-(2-bromally)-pyrrolidine used as starting material can be prepared by analogy to Example 1 from pyrrolidine and 2,3-dibromopropene in benzene. Boiling point, 84–88° C. under a 23 mm. Hg pressure.

EXAMPLE 12

In a manner analogous to that described in Example 8 or 9, 1,2-diphenyl-2-acetoxy-3-(pyrrolidinomethyl)-3-butene hydrochloride of the formula

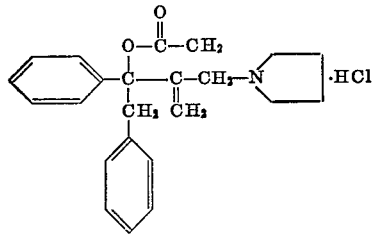

melting at 173–176° C., is obtained by reacting 1,2-diphenyl-3-(pyrrolidinomethyl)-3-buten-2-ol with acetic anhydride or ketene.

EXAMPLE 13

7.2 g. of magnesium (0.3 mol) are etched with iodine and susepnded in 20 ml. of absolute tetrahydrofuran. The reaction is triggered off with 0.8 ml. of ethyl bromide before 49.2 g. (0.3 mol) of N,N-dimethyl-2-bromallylamine in 50 ml. of absolute tetrahydrofuran are added dropwise in such manner that reflux temperature is maintained, and the batch then refluxed on a water bath for 1 hour. After that, 46.0 g. (0.2 mol) of benzyl-(para-chlorophenyl)-ketone dissolved in 125 ml. of absolute tetrahydrofuran are added in a manner such as not to interrupt the exothermic reaction, and the batch then refluxed for 8 hours. It is then poured into 60 g. of ammonium chloride in 500 ml. of water, the whole dissolved in ether, and any residual ketone eliminated by extraction with a total of 500 ml. of 2 N-hydrochloric acid. The hydrochloric extract, from which crystals separate, is alkalinized with 10 N-sodium hydroxide solution (about 120 ml.) and the liberated base dissolve in ether. The ethereal solution is washed with water, dried, and the ether evaporated. The residue is 1-phenyl-2-(para-chlorophenyl)-3-(dimethylaminomethyl)-3-butene-2-ol of the formula:

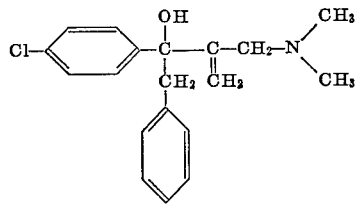

in the form of a very slowly crystallizing resin.

When the product is dissolved in ethyl acetate and treated with 2.5 N ethanolic hydrochloric acid until an acid reaction is achieved, 1-phenyl-2-(para-chlorophenyl)-3-(dimethylaminomethyl)-3-buten-2-ol hydrochloride is obtained which melts at 241–243° C.

EXAMPLE 14

7.2 g. of magnesium (0.3 mol) are etched with iodine and suspended in 20 ml. of absolute tetrahydrofuran. The reaction is triggered off with 0.8 ml. of ethyl bromide before 49.2 g. (0.3 mol) of N,N-dimethyl-2-bromallylamine in 50 ml. of absolute tetrahydrofuran are added dropwise in such manner that reflux temperature is maintained, and the batch then refluxed on a water bath for 1 hour. After that, 45.0 g. (0.2 mol) of benzyl-(para-methoxyphenyl)-ketone dissolved in 125 ml. of absolute tetrahydrofuran are added in a manner such as not to interrupt the exothermic reaction, and the batch then refluxed for 8 hours. It is then poured into 60 g. of ammonium chloride in 500 ml. of water, the whole dissolved in either, and any residual ketone eliminated by extraction with dilute acetic acid. The batch is alkalinized by treatment with sodium hydroxide solution, and the liberated base dissolved in ether. The ethereal solution is washed with water, dried, and the ether evaporated. The residue is 1-phenyl-2-(para-methoxyphenyl)-3-(dimethylaminomethyl)-3-buten-2-ol of the formula:

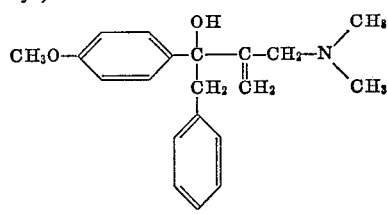

Dissolution in ethyl acetate and treatment with 2.5 N-ethanolic hydrochloric acid until an acid reaction is achieved yields 1-phenyl-2-(para-methoxyphenyl)-3-(dimethylaminomethyl) - 3 - buten-2- ol hydrochloride melting at 206–208° C. (with decomposition).

EXAMPLE 15

7.2 g. of magnesium (0.3 mol) are etched with iodine and suspended in 20 ml. of absolute tetrahydrofuran. The reaction is triggered off with 0.8 ml. of ethyl bromide before 49.2 g. (0.3 mol) of N,N-dimethyl-2-bromallylamine in 50 ml. of absolute tetrahydrofuran are added dropwise in such manner that reflux temperature is maintained, and the batch then refluxed on a water bath for 1 hour. After that, 46.0 g. (0.2 mol) of para-chloro-benzyl-phenyl-ketone, dissolved in 125 ml. of absolute tetrahydrofuran are added in a manner such as not to interrupt the exothermic reaction, and the batch then refluxed for 8 hours. It is then poured into 60 g. of ammonium chloride in 500 ml. of water, the whole dissolved in ether, and any residual ketone eliminated by extraction with 2× 100 ml. of 2 N-acetic acid. The precipitate is isolated and dissolved in warm benzene. The ethereal and benzene solutions are then extracted with a total of 350 ml. of 2 N-hydrochloric acid. The acetic acid extracts and the hydrochloric acid extracts are combined, whereupon crystals form. The combined extracts are rendered alkaline with 150 ml. of 10 N-sodium hydroxide solution, and the liberated base dissolved in ether. The ethereal solution is washed with water, dried, and the ether evaporated. The resulting residue is 1-(para-chlorophenyl)2-phenyl-3-(dimethylaminomethyl)-3-buten - 2 - ol of the formula:

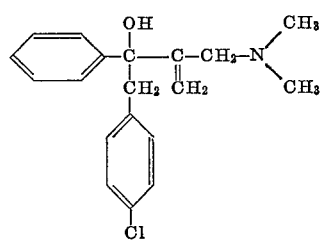

Dissolution of the product in ethyl acetate and treatment with 2.5 N-ethanolic hydrochloric acid until an acid reaction is achieved yield 1-(para-chlorophenyl)-2-phenyl-3-(dimethylaminomethyl)-3-buten-2-ol hydrochloride melting at 226–227° C.

EXAMPLE 16

7.2 g. of magnesium (0.3 mol) are etched with iodine and suspended in 20 ml. of absolute tetrahydrofuran. The reaction is triggered off with 0.8 ml. of ethyl bromide before 49.2 g. (0.3 mol) of N,N-dimethyl-2-bromallyl-amine in 50 ml. of absolute tetrahydrofuran are added dropwise in such manner that reflux temperature is maintained, and the batch then refluxed on a water bath for 1 hour. After that, 45.0 g. (0.2 mol) of para-methoxybenzyl-phenyl-ketone, dissolved in 125 ml. of absolute tetrahydrofuran are added in a manner such as not to interrupt the exothermic reaction, and the batch then refluxed for 8 hours. It is then poured into 60 g. of ammonium chloride in 500 ml. of water, the whole dissolved in ether, and any residual ketone eliminated by extraction with 500 ml. of 2 N-acetic acid, and then with 300 ml. of 2 N-hydrochloric acid. The acid extracts are treated with 200 ml. of 10 N-sodium hydroxide solution and the liberated base dissolved in ether. The ethereal solution is washed with water, dried, and the ether evaporated to obtain as a residue 1-(para-methoxyphenyl)-2-phenyl-3-(dimethylaminomethyl)-3-buten-2 - ol of the formula:

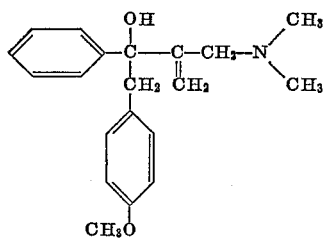

Dissolution in ethyl acetate and treatment with 2.5 N-ethanolic hydrochloric acid until an acid reaction is achieved yield 1-(para-methoxyphenyl)-2-phenyl-3-(dimethylaminomethyl)-3-buten-2-ol hydrochloride of melting point 209°–211° C.

EXAMPLE 17

7.2 g. of magnesium (0.3 mol) are etched with iodine and suspended in 20 ml. of absolute tetrahydrofuran. The reaction is triggered off with 0.8 ml. of ethylbromide before 66.0 g. (0.3 mol) of 1-(2-bromallyl)-4-methyl-piperazine in 50 ml. of absolute tetrahydrofuran are added dropwise in such manner that reflux temperature is maintained, and the batch then refluxed for 1 hour on a water bath. After that, a solution of 49.0 g. (0.25 mol) of desoxybenzoin in 125 ml. of absolute tetrahydrofuran is added in a manner such as not to interrupt the exothermic reaction, and the batch then refluxed for 8 hours. It is then poured into 60 g. of ammonium chloride in 500 ml. of water, the whole dissolved in ether, and any residual ketone eliminated by extraction with a total of 600 ml. of 2 N-acetic acid. The acetic extract is treated with 150 ml. of 10 N-sodium hydroxide solution, and the liberated base dissolved in ether. The ethereal solution is washed with water, dried, and the ether evaporated. The resulting residue is 1,2-diphenyl-3-(N′-methylpiperazinomethyl)-3-buten-2-ol of the formula:

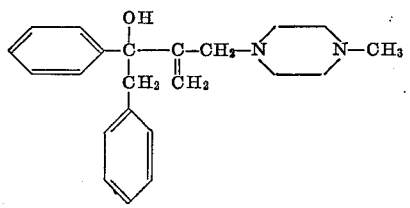

When the product is dissolved in ethyl acetate and treated with 2.5 N-ethanolic hydrochloric acid until an acid reaction it attained, there is obtained 1,2-diphenyl-3-(N′-methylpiperazinomethyl)-3-buten - 2 - ol dihydrochloride of melting point 209° C. (decomposition).

EXAMPLE 18

17.5 g. of 1-phenyl-2-(para-chlorophenyl)-3-(dimethyl-aminomethyl)-3-buten-2-ol are heated at 70° C. for 5 hours with 100 ml. of propionic anhydride. On exaporation of the reaction mixture in vacuo a viscous residue is obtained. It is dissolved in 75 ml. of ethyl acetate and the solution treated with 26 ml. of 2.6 N-ethanolic hydrochloric acid. The crystals that precipitate are separated, the mother liquor concentrated and treated with a small amount of ethyl aceate. The resulting crystals are separated and, together with the product obtained from the first crystallizaion, dissolved in methylene chloride. The insoluble matter is filtered off, and the methylene chloride solution treated with the four-fold quantity of ethyl acetate, whereupon the 1-phenyl-2-(para-chlorophenyl)-2-propionyloxy - 3 - (dimethylaminomethyl)-3-butene hydrochloride of the formula:

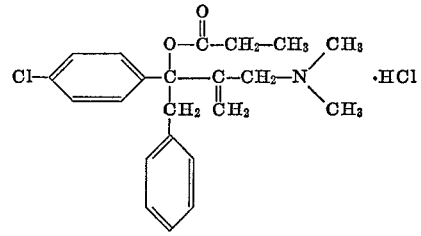

crystallizes. It melts at 190–192° C.

In a similar manner, 1-phenyl-2-(para-chlorophenyl)-2-acetoxy-3-(dimethylaminomethyl)-3-butene hydrochloride can be obtained.

EXAMPLE 19

20.5 g. of 1-phenyl-2-(para-methoxyphenyl) - 3 - (dimethylaminomethyl)-3-buten-2-ol are heated at 70° C. for 5 hours with 100 ml. of propionic anhydride. On evaporation of the raction mixture in vacuo, a residue is obtained which is dissolved in ethyl acetate. The solution is treated with 27 ml. of 2.6 N-ethanolic hydrochloric acid, the reaction mixture is evaporated in vacuo, the residue dissolved in ethyl acetate, and a precipitate formed by the addition of 300 ml. of ether. The precipitated oil is dissolved in 50 ml. of ethyl aceate and precipitated again with 300 ml. of ether. The ether is decanted, and the residue dried in a high vacuum to obtain 1-phenyl-2-(para-methoxyphenyl) - 2 - propionyloxy - 3 - (dimethylaminomethyl)-3-butene hydrochloride of the formula:

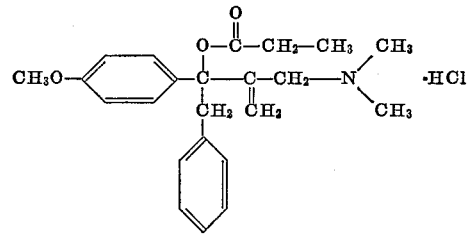

in the form of an amorphous powder melting at about 80° C.

1-phenyl-2-(para-methoxyphenyl)-2 - acetoxy - 3 - (dimethylaminomethyl)-3-butene hydrochloride can be obtained in a similar manner.

EXAMPLE 20

18 g. of 1-(para-chlorophenyl)-2-phenyl-3-(dimethyl-aminomethyl)-3-buten-2-ol are heated at 80° C. for 5 hours with 100 ml. of propionic anhydride. The latter is evaporated under reduced pressure, the residue dissolved in 75 ml. of ethyl acetate, the solution treated with 28 ml. of 2.5 N-ethanolic hydrochloric acid, and the solvent expelled under vacuum. The residue is allowed to stand with 25 ml. of ethyl acetate, whereupon the product begins to crystallize. The batch is diluted with 100 ml. of ethyl acetate, and the crystals filtered off. There is obtained in this manner 1-(para-chlorophenyl)-2-phenyl-2 - propionyloxy- 3-(dimethylaminomethyl)-3-butene hydrochloride of the formula:

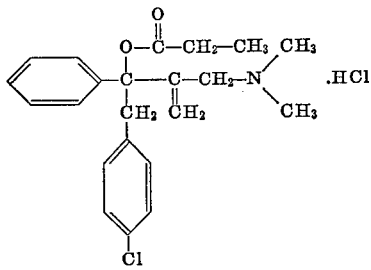

melting at 174° C.

1-(para-chlorophenyl)-2-phenyl-2-acetoxy-3 - dimethyl-aminomethyl)-3-butene hydrochloride can be obtained in a similar manner.

EXAMPLE 21

26 g. of 1-(para-methoxyphenyl)-2-phenyl-3-(dimethyl-aminomethyl)-3-buten-2-ol are heated at 70° C. for 5 hours with 100 ml. of propionic anhydride. On evaporation of the reaction mixture a residue is obtained which is dissolved in 75 ml. of ethyl acetate, the solution is treated with 36 ml. of 2.6 N-ethanolic hydrochloric acid, and evaporated to dryness under reduced pressure. The residue is dissolved in 25 ml. of ethyl acetate and the solution allowed to stand. The crystals that form are filtered off and washed with ethyl aceate. There is obtained in this manner 1-(para-methoxyphenyl)-2-phenyl - 2 - propionyl-oxy-3-(dimethylaminomethyl)-3-butene hydrochloride of the formula

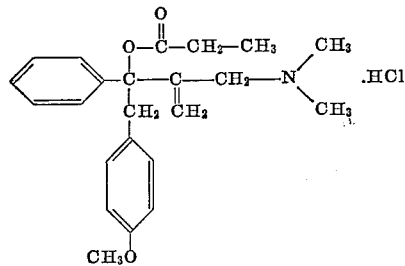

melting at 150–152° C.

In a similar manner 1-(para-methoxyphenyl)-2-phenyl-2-acetoxy-3-(dimethylaminomethyl)-3-butené hydrochloride can be obtained.

EXAMPLE 22

In a manner analogous to that described in Example 9 or 10, 1,2-diphenyl-2-acetoxy-3-(N'-methyl-piperazino-methyl)-3-butene dihydrochloride of the formula:

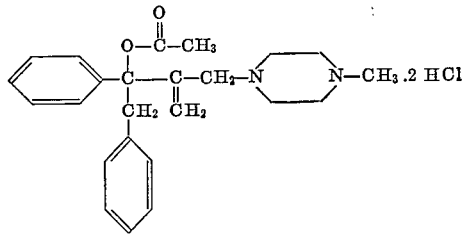

melting at 160–162° C., is obtained by reacting 1,2-di-phenyl-3-(N'-methyl-piperazinomethyl)-3-buten-ol with acetic anhydride.

EXAMPLE 23

In a flask equipped with a stirrer, 7.2 g. of magnesium (0.3 mol) are etched with a little iodine and treated with 20 ml. of absolute tetrahydrofuran and with 0.8 ml. of ethylbromide. Slight heating triggers off the reaction, and within 15 minutes 49.2 g. (0.3 mol) of N,N-dimethyl-2-bromoallylamine in 50 ml. of absolute tetrahydrofuran are added dropwise so that the solution keeps boiling. The batch is heated at 95° C. for another 2 hours in the bath until the magnesium is dissolved completely. Without cooling, 42.06 g. (0.2 mol) of 3-phenyl-propiophenone in 125 ml. of absolute tetrahydrofuran are run in in such manner that the reaction mixture keeps boiling. It is then refluxed for 6 hours, then poured into a solution of 60 g. of ammonium chloride in 500 ml. of water, and the oil that precipitates is extracted with ether, washed with water, and the ether extracted several times with 2 N-hydrochloric acid (350 ml. in all). The hydrochloric acid extract is rendered alkaline with 150 ml. of 10 N-sodium hydroxide solution, the oil which precipitates is dissolved in ether and the solution washed with water. There is obtained in this manner 1,3-diphenyl-4-(dimethylamino-methyl)-4-penten-3-ol of the formula:

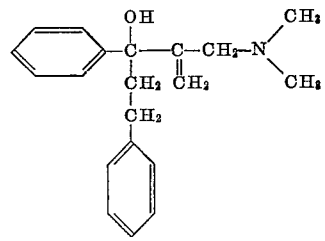

as a very slowly crystallizing oil.

Treatment of this base in ethyl acetate with the calculated quantity of alcoholic hydrochloric acid yields 1,3-diphenyl-4-(dimethylaminomethyl)-4-penten-3-ol hydrochloride of melting point 157–160° C.

EXAMPLE 24

In a flask equipped with a stirrer, 7.2 g. of magnesium (0.3 mol) are etched with a little iodine and treated with 20 ml. of absolute tetrahydrofuran and with 0.8 ml. of ethylbromide. Slight heating triggers off the reaction, and within 15 minutes 49.2 (0.3 mol) of N,N-dimethyl-2-bromoallylamine in 50 ml. of absolute tetrahydrofuran are added dropwise so that the solution keeps boiling. The batch is heated at 95° C. for another 2 hours in the bath until the magnesium is dissolved completely. Without cooling, 56.8 g. (0.2 mol) of α-ethyl-desoxy-anisoin in 125 ml. of absolute tetrahydrofuran are run in in such manner that the reaction mixture keeps boiling. It is then refluxed for 6 hours, then poured into a solution of 60 g. of ammonium chloride in 500 ml. of water, and the oil that precipitates is extracted with ether, washed with water, and the ether extracted several times with 2 N-hydrochloric acid (350 ml. in all). The hydrochloric acid extract is rendered alkaline with 150 ml. of 10 N-sodium hydroxide solution, the oil which precipitates is dissolved in ether and the solution washed with water. There is obtained in this manner 3,4-bis-(para-methoxyphenyl)-5-(dimethylaminomethyl)-5-hexen-4-ol of the formula:

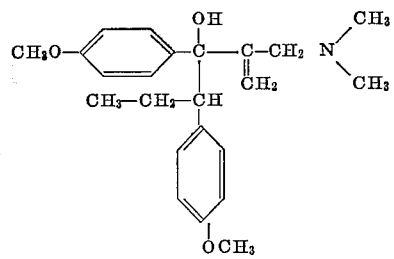

as a very slowly crystallizing oil.

Treatment of this base in ethyl acetate with the calculated quantity of alcoholic hydrochloric acid yields 3,4-bis - (para - methoxy - phenyl) - 5 - (dimethyl - amino-methyl)-5-hexen-4-ol hydrochloride of melting point 217–219° C.

EXAMPLE 25

In a flask equipped with a stirrer, 7.2 g. of magnesium (0.3 mol) are etched with a small amount of iodine, then treated with 20 ml. of absolute tetrahydrofuran and 0.8 ml. of ethyl bromide. The reaction is triggered off by slight heating and, within 15 minutes, 49.2 g. (0.3 mol) of N,N-dimethyl-2-bromoallylamine in 50 ml. of tetrahydrofuran are added dropwise, so that the solution keeps boiling. The batch is heated for another 2 hours at a bath temperature of 95° C. until all of the magnesium has dissolved. After this, 44.86 g. (0.2 mol) of α-ethyldesoxybenzoin in 125 ml. of tetrahydrofuran are run in without cooling in such manner that the reaction mixture keeps boiling. The batch is then refluxed for 6 hours, and poured into a solution of 60 g. of ammonium chloride in 500 ml. of water. The oil which precipitates is extracted with ether, the ethereal solution washed with water, and the ether extracted repeatedly with 2 N-hydrochloric acid (500 ml. in all). The hydrochloric acid extract crystallizes after a short while. The crystals are filtered off with suction, washed with dilute hydrochloric acid and then with ethyl acetate. The hydrochloric acid mother liquor is treated with 200 ml. of 10 N-sodium hydroxide solution and the remainder of the base obtained by extraction with ether. The ether residue is dissolved in 75 ml. of ethyl acetate and the solution treated with (2.4 N-) ethanolic hydrochloric acid until an acid reaction is reached (25 ml.). The crystals that precipitate are isolated. They are identical with the hydrochloride obtained from the aqueous hydrochloric acid. The substance is 3,4 - diphenyl - 5 - (dimethylaminomethyl) - 5 - hexen-4-ol hydrochloride of the formula:

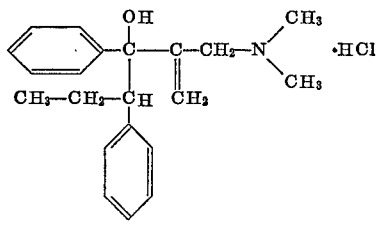

melting at 237–239° C. From the hydrochloride, the free base can be obtained as a slowly crystallizing oil by means of sodium hydroxide solution and isolation with ether.

EXAMPLE 26

25 g. of 1,3-diphenyl-4-(dimethylaminomethyl)-4-penten-3-ol are heated at 50° C. for 5 hours with 100 ml. of propionic acid anhydride. The batch is evaporated under reduced pressure, towards the end at a bath temperature of 70° C., the residue is dissolved in 75 ml. of ethyl acetate, 2.5 N-ethanolic hydrochloric acid are added until a weakly acid reaction is achieved and also 400 ml. of ether, the batch is evaporated in vacuo to about 75 ml., and about 100 ml. of ether are then slowly added. The crystalline precipitate is isolated and washed with acetone. There is obtained in this manner 1,3-diphenyl-3-propionyloxy-4-(dimethylaminomethyl)-4-pentene hydrochloride of the formula:

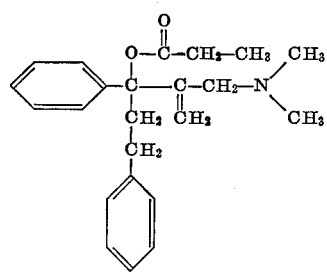

melting at 171–172° C.

EXAMPLE 27

23.6 g. of 3,4-diphenyl-5-(dimethylaminomethyl)-5-hexen-4-ol and 100 ml. of propionic anhydride are heated at 50° C. for 5 hours. The batch is evaporated under reduced pressure, at the end at a bath temperature of 70° C. The residue is dissolved in 75 ml. of ethyl acetate, and 2,5 N-ethanolic hydrochloric acid is added until a slightly acid reaction is reached, and then 250 ml. of ether are also added. The crystalline precipitate is isolated and washed with ethyl acetate. In this manner, 3,4-diphenyl - 4 - propionyloxy-5-(dimethylaminomethyl) - 5 - hexene hydrochloride of the formula:

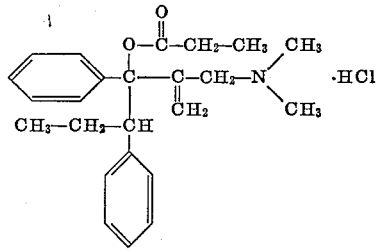

melting at 160–162° C. is obtained. The compound shows a strong CO band at 5.75μ in the infrared spectrum.

EXAMPLE 28

56.28 g. (0.2 mol) of 1,2-diphenyl-3-(dimethylaminomethyl)-3-buten-2-ol are dissolved in 200 ml. of acetone and treated with a solution of 15.0 g. (0.1 mol) of D(+)-tartaric acid in 400 ml. of acetone. The reaction mixture is scratched with a glass rod and allowed to stand for 4 hours at room temperature. The precipitated crystals are filtered with suction and washed with acetone. (From this mother liquor the l-form may be obtained, as described in the example below.) By recrystallizing the resulting crystals from a mixture of 250 ml. of acetone and 285 ml. of absolute ethanol there is obtained d-1,2-diphenyl-3-(dimethylaminomethyl)-3-buten-2-ol - D-tartrate melting at 142–145° C.; optical rotation:

$$[\alpha]_D^{20°} + 86° \pm 1°$$

(in water, c.=1%).

58 g. of d-1,2-diphenyl-3-(dimethylaminomethyl)-3-buten-2-ol-D-tartrate are dissolved in 300 ml. of water and treated with 200 ml. of 2 N sodium hydroxide solution and extracted with ether. The ethereal solution is washed twice with water, dried and evaporated to dryness in vacuo, to yield as residue d-1,2-diphenyl-3-(dimethylaminomethyl)-3-buten-2-ol melting at 79–84° C.; optical rotation: $[\alpha]_D^{20°} = +195° \pm 0.5°$ (in chloroform, c.=2%).

EXAMPLE 29

The acetone mother liquor from Example 28 is treated with a solution of 15.0 g. (0.1 mol) of D(+)tartaric acid in 400 ml. of acetone. The reaction mixture is scratched with a glass rod and allowed to stand for 4 hours. The resulting crystals are filtered with suction and washed with acetone, to yield a tartrate having an optical rotation $[\alpha]_D^{20°}$ of −26° to −36° (in water).

Tartrates obtained from various experiments with $[\alpha]_D^{20°}$ of −26° to −36° are combined, dissolved in water, the base precipitated with 2 N sodium hydroxide solution and isolated with ether. 79.4 g. (0.282 mol) of the so-obtained 1,2-diphenyl-3-(dimethylaminomethyl)-3-buten-2-ol, which has an $[\alpha]_D^{20°}$ of approximately −92° (in chloroform), are dissolved in 300 ml. of acetone and treated with a solution of 21.0 g. (0.141 mol) of D-tartaric acid in 400 ml. of acetone with heating. After five hours the batch is filtered with suction and 54 g. of a product are obtained which melts at 138–141° C. and has an optical rotation: $[\alpha]_D^{20°} = -42°$ (in water); (the mother liquor treated again with 21.0 g. of D-tartaric acid in 400 ml. of acetone yields another 57 g. melting at 130–137° C. and having an optical rotation:

$$[\alpha]_D^{20°} = -14°)$$

The D-tartrate with $[\alpha]_D^{20°} = -42°$ is recrystallized from a mixture of 250 ml. of acetone and 285 ml. of absolute ethanol and yields a crystallisate melting at 139–145° C. and an optical rotation: $[\alpha]_D^{20°} = -49°$ (in water).

Renewed recrystallization from a mixture of 250 ml. of acetone and 200 ml. of ethanol yields a product melting at 147–149° C. and having an optical rotation:

$$[\alpha]_D^{20°} = -67°$$

(in water). This tartrate is dissolved in water, the base precipitated with 2 N sodium hydroxide solution and isolated with ether. The ethereal solution is washed twice with water, dried and the ether evaporated, to yield l-1,2-diphenyl-3-(dimethylaminomethyl)-3-buten-2-ol melting at 79–80° C., optical rotation: $[\alpha]_D^{20°} = -201° \pm 0.5°$ (in chloroform, c.=2%).

EXAMPLE 30

30 g. of d-1,2-diphenyl-3-(dimethylaminomethyl)-3-buten-2-ol are heated with 200 ml. of propionic acid anhydride for 5 hours at 70° C. (bath temperature). The excess propionic acid anhydride is evaporated in vacuo. The residue is dissolved in ethyl acetate and treated with a solution of approximately 10% more than the calculated quantity of maleic acid in acetone. By the successive addition of ether, d-1,2-diphenyl-2-propionyloxy-3-(dimethylaminomethyl)-3-butene maleate precipitates in crystalline form; M.P. 127–131° C.; optical rotation: $[\alpha]_D^{20°} = +35° \pm 0.5°$ (in water, c.=2.05%).

EXAMPLE 31

30 g. of l-1,2-diphenyl-3-(dimethylaminomethyl)-3-buten-2-ol are heated with 200 ml. of propionic acid anhydride for 5 hours at 70° C. (bath temperature). The excess propionic acid anhydride is evaporated in vacuo. The residue is dissolved in ethyl acetate and treated with a solution of approximately 10% more than the calculated quantity of maleic acid in acetone. By the successive addition of ether, l-1,2-diphenyl-2-propionyloxy-3-(dimethylaminomethyl)-3-butene maleate is precipitated in crystalline form; M.P. (128) 130–132° C.; optical rotation $[\alpha]_D^{20°} \pm 1°$ (in water, c=2.05%).

EXAMPLE 32

Tablets containing 30 mg. of 1,2-diphenyl-2-propionyloxy-3-(dimethylaminomethyl)-3-butene hydrochloride can be prepared from the following ingredients:

| | per tablet, mg. |
|---|---|
| 1,2 - diphenyl - 2-propionyloxy-3-dimethylaminomethyl)-3-butene hydrochloride | 30.0 |
| Colloidal silicic acid | 3.0 |
| Lactose | 20.0 |
| Wheat starch | 10.0 |
| Cellulose powder | 20.0 |
| Arrowroot | 10.0 |
| Talc | 6.0 |
| Magnesium stearate | 1.0 |
| | 100.0 |

Preparation

The mixture of 1,2-diphenyl-2-propionyloxy-3-dimethylaminomethyl)-3-butene hydrochloride, lactose, wheat starch and cellulose powder is well moistened with ethyl alcohol. The colloidal silicic acid is then added in small portions, and the whole kneaded until a plastic mass is obtained. The latter is forced through a sieve having a mesh width of 4–5 mm., then dried at 45° C. The dry granulate is forced through a sieve having a mesh width of 0.8–1.0 mm., then mixed homogeneously with the disintegrating and lubricating agents. The mixture is compressed in the usual manner into tablets having a diameter of 6 mm. and a gross weight of 100 mg.

In an analogous manner, tablets containing 30 mg. of 1-2 - diphenyl-2-acetoxy-3-(dimethylaminomethyl)-3-butene hydrochloride can be prepared.

EXAMPLE 33

Hard gelatine capsules containing 30 mg. of 1-2-diphenyl - 2 - propionyloxy-3-(dimethylaminomethyl)-3-butene hydrochloride can be prepared, for example, from the following ingredients:

| | per capsule, mg. |
|---|---|
| 1,2 - diphenyl - 2-propionyloxy-3-dimethylaminomethyl)-3-butene hydrochloride | 30.0 |
| Lactose | 74.5 |
| Talc | 5.0 |
| Collodial silicic acid | 0.5 |
| | 110.0 |

Preparation

The 1,2 - diphenyl - 2-propionyloxy-3-(dimethylaminomethyl)-3-butene hydrochloride is homogeneously mixed with the lactose, talc and colloidal silicic acid and the mixture filled into hard gelatine capsules No. 4 by means of a suitable filling and sealing apparatus. An average of 110 mg. is filled into each capsule.

In an analogous manner, capsules containing 30 mg. of 1,2 - diphenyl-3-(dimethylaminomethyl)-3-butene-2-ol hydrochloride can be prepared.

I claim:
1. A member selected from the group consisting of compounds of the formula:

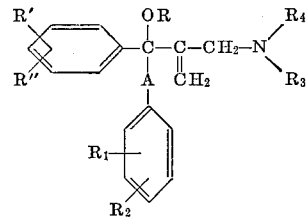

in which A stands for lower alkylene, R for a member selected from the group consisting of lower alkanoyl, carbo-lower alkoxy and hydrogen, R', R'', $R_1$ and $R_2$ each stands for a member selected from the group consisting of hydrogen, lower alkyl, lower alkoxy, halogen and trifluoromethyl, and $R_3$ and $R_4$ each stands for a member selected from the group consisting of lower alkyl, and, when taken together with the nitrogen atom, lower alkyleneimino, morpholino, thiamorpholino and N'-lower alkyl piperazino and their acid addition salts.

2. A compound as claimed in claim 1, wherein in the formula A stands for methylene, R stands for lower alkanoyl, $R_1$, $R_2$ and R'' each stands for hydrogen, $R_2$ for a member selected from the group consisting of lower alkyl, lower alkoxy, halogen and trifluoromethyl and

for a member selected from the group consisting of di-lower alkylamino, pyrrolidino, piperidino, morpholino and N'-lower alkyl-piperazino.

3. A compound as claimed in claim 1, wherein in the formula A stands for methylene, R for lower alkanoyl R', R'' and $R_2$ each stands for hydrogen, R for a member selected from the group consisting of lower alkyl, lower alkoxy, halogen and trifluoromethyl and

for a member selected from the group consisting of di-lower alkylamino, pyrrolidino, piperidino, morpholino and N'-lower alkyl-piperazino.

4. A compound as claimed in claim 1, wherein in the formula A stands for methylene $R_1$, $R_2$, $R'$ and $R''$ each stands for hydrogen, R stands for lower alkanoyl and

or a member selected from the group consisting of di-lower alkylamino, pyrrolidino, piperidino, morpholino and N'-lower alkyl-piperazino.

5. A compound as claimed in claim 4, in which R represents a member selected from the group consisting of acetyl and propionyl.

6. A compound as claimed in claim 1, wherein in the formula A stands for methylene, $R_1$, $R_2$, $R'$ and $R''$ each stands for hydrogen R for acetyl and

or a member selected from the group consisting of diethylamino, piperidino, pyrrolidino and N'-methylpiperazino.

7. A compound as claimed in claim 1, wherein in the formula A stands for methylene, $R_1$, $R_2$, $R'$ and $R''$ each stands for hydrogen R for hydrogen and

or a member selected from the group consisting of diethylamino, piperidino, pyrrolidino and N'-methylpiperazino.

8. A compound as claimed in claim 1, wherein in the formula A stands for methylene $R_2$ and $R''$ for hydrogen, one of the symbols $R_1$ and $R'$ stands for a member selected from the group consisting of para-chloro and para-methoxy and the other for hydrogen $R_3$ and $R_4$ each stands for methyl and R for a member selected from the group consisting of acetyl and propionyl.

9. A compound as claimed in claim 1, wherein in the formula A stands for methylene $R_2$ and $R''$ for hydrogen, one of the symbols $R_1$ and $R'$ stands for a member selected from the group consisting of para-chloro and para-methoxy and the other for hydrogen $R_3$ and $R_4$ each stands for methyl and R for hydrogen.

10. A compound as claimed in claim 1, wherein in the formula A stands for methylene, $R_1$, $R_2$, $R'$ and $R''$, each stands for hydrogen, $R_3$ and $R_4$ each stands for methyl and R for acetyl.

11. A compound as claimed in claim 1, wherein in the formula A stands for methylene, $R_1$, $R_2$, $R'$ and $R''$, each stands for hydrogen, $R_3$ and $R_4$ each stands for methyl and R for propionyl.

12. A compound as claimed in claim 1, which compound is d-1,2-diphenyl - 2 - propionyloxy-3-(dimethylaminomethyl)-3-butene or an acid addition salt thereof.

13. A compound as claimed in claim 1, which compound is d-1,2-diphenyl - 3 - (dimethylaminomethyl)-3-buten-2-ol or an acid addition salt thereof.

No references cited.

ALEX MAZEL, Primary Examiner

J. TORAR, Assistant Examiner

U.S. Cl. X.R.

260—247.2, 247.7, 294.3, 294.7, 326.3, 326.5, 490, 570.6; 424—248, 250, 267, 274

UNITED STATES PATENT OFFICE
CERTIFICATE OF CORRECTION

PO-1050 (5/69)

Patent No. 3,487,469  Dated December 30, 1969

Inventor(s) ADRIAN MARXER

It is certified that error appears in the above-identified patent and that said Letters Patent are hereby corrected as shown below:

Column 1, lines 43 to 46, the formula should read:

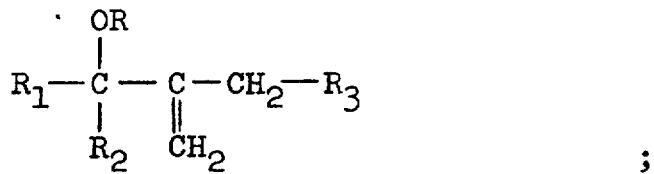

line 55, "radicas" should read --- radicals ---.

Column 3, line 18, "ketone" should read --- ketene ---.

Column 4, lines 66 to 70, the formula should read:

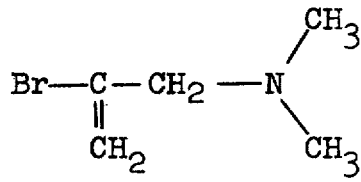

Column 5, lines 17 to 22, the bottom right hand side of the formula should read:

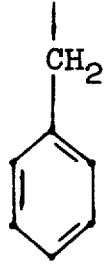

PO-1050
(5/69)

UNITED STATES PATENT OFFICE
CERTIFICATE OF CORRECTION

Patent No. 3,487,469          Dated December 30, 1969

Inventor(s) ADRIAN MARXER

It is certified that error appears in the above-identified patent and that said Letters Patent are hereby corrected as shown below:

Column 8, line 49, "2-bromally" should read --- 2-bromallyl ---; lines 67 to 75, the right hand side of the formula should read:

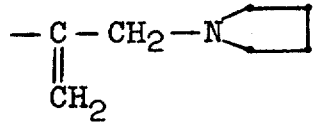

Column 9, line 6, "bromally" should read --- bromallyl ---; lines 15 to 17, the top half of the formula should read:

line 30, "susepnded" should read --- suspended ---;
line 49, "butene" should read --- buten ---.

Column 10, line 6, "either" should read --- ether ---.

Column 12, line 6, "aceate" should read --- acetate ---;
line 41, "aceate" should read --- acetate ---.

Column 13, line 29, "aceate" should read --- acetate ---;
line 63, after "buten-" insert --- 2- ---.

Column 16, line 24, after "(+)" delete "-".

Column 17, line 41, "tion $[\alpha]_D 20° \pm 1°$" should read --- tion: $[\alpha]_D^{20°} = -32° \pm 1°$ ---;

line 74, "1-2" should read --- 1,2 ---.

UNITED STATES PATENT OFFICE
CERTIFICATE OF CORRECTION

Patent No. 3,487,469                     Dated December 30, 1969

Inventor(s) ADRIAN MARXER

It is certified that error appears in the above-identified patent and that said Letters Patent are hereby corrected as shown below:

Column 18, line 1, "1-2" should read --- 1,2 ---;
line 51, after "hydrogen," delete "$R_2$" and insert --- R' ---;   line 63, after "alkanoyl" insert --- , ---.

SIGNED AND SEALED
MAR 9 1971

MAR. 9, 1971

(SEAL)
Attest:

Edward M. Fletcher, Jr.
Attesting Officer

WILLIAM E. SCHUYLER, JR.
Commissioner of Patents